(12) United States Patent
Mihran

(10) Patent No.: US 6,547,671 B1
(45) Date of Patent: Apr. 15, 2003

(54) LAUNCH AND AIM ANGLE DETERMINATION FOR AN OBJECT

(75) Inventor: Richard T. Mihran, Longmont, CO (US)

(73) Assignee: The DistanceCaddy Company, LLC, Fort Collins, CO (US)

( * ) Notice: Subject to any disclaimer, the term of this patent is extended or adjusted under 35 U.S.C. 154(b) by 0 days.

(21) Appl. No.: 09/314,867

(22) Filed: May 19, 1999

Related U.S. Application Data
(60) Provisional application No. 60/117,552, filed on Jan. 28, 1999.

(51) Int. Cl.$^7$ ............................................... A63B 69/36
(52) U.S. Cl. ....................................................... 473/131
(58) Field of Search ........................ 473/131, 150–156, 473/198, 199, 407, 190, 192, 140; 73/1.75, 1.79, 1.37, 1.45, 1.41, 488, 514.15, 514.16, 514.26, 514.34; 342/109, 104, 118

(56) References Cited

U.S. PATENT DOCUMENTS

| | | | |
|---|---|---|---|
| 3,438,031 A | 4/1969 | Fathauer | 343/8 |
| 3,508,440 A | 4/1970 | Murphy | 73/379 |
| 3,837,655 A | 9/1974 | Angelos | 273/185 |
| 3,938,809 A | 2/1976 | Gentiluomo | 273/176 |
| 4,137,566 A | 1/1979 | Haas et al. | 364/410 |
| 4,160,942 A * | 7/1979 | Lynch et al. | 350/120 |
| 4,276,548 A | 6/1981 | Lutz | 343/7 |
| 4,545,576 A | 10/1985 | Harris | 273/25 |
| 4,673,183 A | 6/1987 | Trahan | 273/176 |
| 4,858,922 A | 8/1989 | Santavaci | 273/26 |
| 5,082,263 A | 1/1992 | Berger | 273/29 |
| 5,092,602 A | 3/1992 | Witler et al. | 273/184 |
| 5,150,895 A | 9/1992 | Berger | 273/29 |
| 5,246,232 A | 9/1993 | Eccher et al. | 273/184 |
| 5,401,026 A | 3/1995 | Eccher et al. | 273/184 |
| 5,479,008 A * | 12/1995 | Nishiyama et al. | 250/222.1 |
| 5,481,355 A | 1/1996 | Iijima et al. | 356/28 |
| 5,700,204 A | 12/1997 | Teder | 473/199 |
| 5,984,794 A * | 11/1999 | Miremadi | 473/199 |

OTHER PUBLICATIONS

"DistanceCaddy" advertising brochure distributed by Colorado Time Systems, Inc.

* cited by examiner

Primary Examiner—Kim Nguyen
(74) Attorney, Agent, or Firm—Marsh Fischmann & Breyfogle LLP

(57) ABSTRACT

The launch angle of an object in flight after being launched from a initial position, such as a golf ball struck by a golf club, is determined by measuring the velocity of the object using a sensor, such as a Doppler Radar transceiver, positioned, for example, at a known distance forward of the initial position along an expected straight aim line. The launch angle is calculated using a mathematical model, describing the relationship between the measured velocity as a function of elapsed time since launch and the geometrical relation between the sensor and the initial position. The aim angle of the object may be determined by performing independent launch angle calculations corresponding with velocity measurements from a plurality of sensors positioned, for example, in a line at a known distance forward of the initial position. The aim angle is obtainable from the ratio of the calculated launch angles.

44 Claims, 2 Drawing Sheets

LAUNCH AND AIM ANGLE DETERMINATION FOR AN OBJECT

RELATED APPLICATION INFORMATION

This application claims priority from provisional application Ser. No. 60/117,552, filed on Jan. 28, 1999.

FIELD OF THE INVENTION

The present invention relates to determining the launch parameters of an object in flight after being launched. More particularly, the present invention relates to the determination of the launch angle and the aim angle of an object that has been launched, such as, for example, a golf ball that has been struck with a golf club.

BACKGROUND OF THE INVENTION

In some applications, it is desirable to determine the launch parameters of an object that is in flight after being launched from an initial position, including the angle at which the object is launched relative to the ground (launch angle) and the angle by which the object's initial trajectory deviates to the left or right from a desired straight trajectory (aim angle). For example, the launch parameters of a golf ball in conjunction with other parameters such as ball velocity, spin rate and rotation axis may be used to accurately predict the trajectory followed by the golf ball after it as been struck with a golf club. Such information can be useful in golf simulator applications, golf equipment research and development applications, training systems, equipment selection systems, and the like.

SUMMARY OF THE INVENTION

In view of the forgoing, one objective of the present invention is to provide for the efficient and accurate determination of the launch angle of an object in flight after being launched, such as a golf ball struck by a golf club.

Another objective of the present invention is to provide for the efficient and accurate determination of the aim angle of an object in flight after being launched, such as a golf ball struck by a golf club.

These and other objectives and advantages are achieved by various aspects of the present invention. According to one aspect of the present invention, a method for determining an approximate launch angle of an object in flight after being launched from an initial position, such as a golf ball struck by a golf club, involves positioning a sensor for measuring the velocity of the object while in flight in a known geometrical relation with the initial position. In this regard, the sensor is preferably an active transmitter/receiver device, such as a Doppler Radar transceiver. The sensor may be positioned forward or rearward of the initial position. In one embodiment, the sensor is positioned at a known distance, for example, between two to six feet, forward of the initial position. Preferably, the sensor is positioned close to a projection of a straight flight path onto the ground expected when the object is launched on a direct bearing towards a desired target location. By way of example, the sensor may be positioned directly between a tee from which a golf ball is to be launched and a desired target hole in a green. When the object is launched on a direct bearing towards a desired target location, such condition may be understood as having an aim angle of zero. The velocity of the object while in flight is measured using the sensor. The launch angle is then calculated using a mathematical model. The mathematical model may describe the relationship between the measured velocity of the object as a function of elapsed time since the object was launched and the known geometrical relation between the sensor and the initial position.

According to another aspect of the present invention, a method for determining at least one launch parameter of an object in flight after being launched from an initial position, such as a golf ball struck by a golf club, involves positioning a plurality of sensors for measuring the velocity of the object while in flight in known geometrical relations with the initial position. In this regard, each of the sensors is preferably an active transmitter/receiver device, such as a Doppler Radar transceiver. Each of the sensors is used to measure the velocity of the object while in flight. Independent launch angle calculations corresponding to each of the sensors are then performed using a mathematical model. In this regard, the mathematical model may describe the relationship between the measured velocity of the object as a function of elapsed time since the object was launched and the known geometrical relation between the sensor and the initial position. The results of the independent launch angle calculations are then used to obtain at least one approximate launch parameter.

The sensors may be positioned such that the launch angle, the aim angle, or both are obtainable by direct calculation using the results of the independent launch angle calculations, interpolation of the results of the launch angle calculations, or examination of the results of the independent launch angle calculations. In this regard, each of the sensors may be positioned along a line that is substantially perpendicular to a projection onto the ground of a straight flight path expected when the object is launched with an aim angle of zero (i.e. on a direct bearing to a desired target location). The line is at a known distance, for example, between about four to six feet, measured along the projection of the expected straight flight path forward of the initial position. The sensors may be positioned along the line at locations corresponding to selected aim angles. With the sensors thus positioned, an approximate aim angle may be obtained by direct calculation from ratios of the results of the independent launch angle calculations. An approximate launch angle may be obtained by examining the results of the independent launch angle calculations to determine which of the launch angle calculations resulted in the smallest calculated launch angle and the smallest calculated launch angle is selected as the launch angle of the object.

According to an additional aspect of the present invention, an apparatus for use in determining the launch angle of an object in flight after being launched from an initial position, such as a golf ball struck by a golf club, includes a sensor for measuring the velocity of the object while in flight that is positionable in a known geometrical relation with initial position. In this regard, the sensor is preferably an active transmitter/receiver device, such as a Doppler Radar transceiver. The sensor may be positionable forward or rearward of the initial position. In one embodiment, the sensor is positionable at a known distance, for example, between two to six feet, forward of the initial position. Preferably, the sensor is positionable close to a projection of a straight flight path onto the ground expected when the object is launched with an aim angle of zero (i.e. when it is launched on a direct bearing to a desired target location). The apparatus also includes a computing device, interfaceable with the sensor, for calculating the launch angle using a mathematical model. The mathematical model may describe the relationship between the measured velocity of the object as a function of elapsed time since the object was launched and the known geometrical relation between the sensor and the initial position. The computing device for calculating the launch angle may comprise a computer programmed for computing the launch angle in accordance with the mathematical model.

According to a further aspect of the present invention, an apparatus for determining at least one launch parameter of an object in flight after being launched from an initial position, such as a golf ball struck by a golf club, includes a plurality of sensors for measuring the velocity of the object while in flight that are positionable in known geometrical relations with the initial position. In this regard, each of the sensors is preferably an active transmitter/receiver device, such as a Doppler Radar transceiver. The apparatus also includes a computing device, interfaceable with each of the sensors, for performing independent launch angle calculations corresponding with each sensor using a mathematical model. In this regard, the mathematical model may describe the relationship between the measured velocity of the object as a function of elapsed time since the object was launched and the known geometrical relation between the sensor and the initial position. The computing device may be a computer programmed for performing the independent launch angle calculations in accordance with the mathematical model. At least one approximate launch parameter is obtainable from the results of the independent launch angle calculations.

These and other features and advantages of the present invention will be apparent upon a review of the following detailed description when taken in conjunction with the accompanying figures.

DETAILED DESCRIPTION

Figure 1:
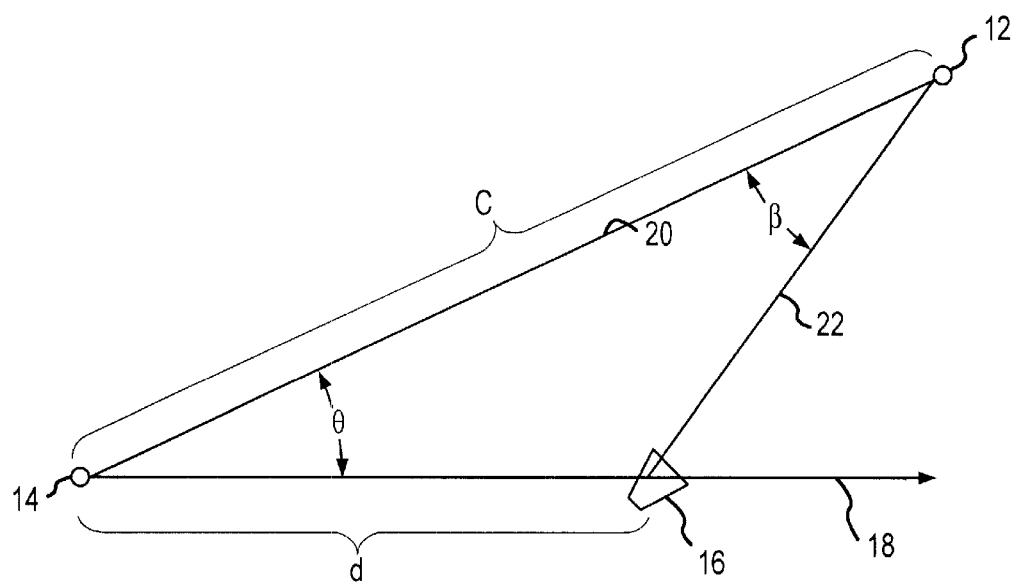
FIG. 1 illustrates a side view of one embodiment of the present invention wherein a single transceiver is positioned for use in determining the launch angle of an object in flight after being launched from an initial position.
Figure 2:
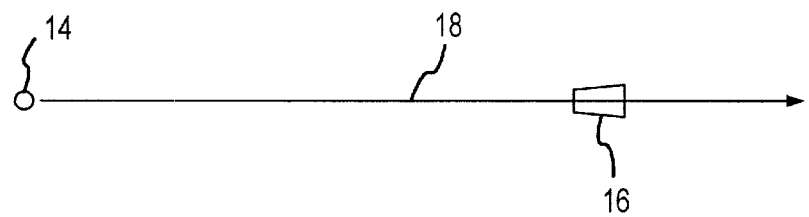
FIG. 2 illustrates a top view of the embodiment shown in FIG. 1.

Referring now to FIGS. 1 and 2, in accordance with the present invention, the launch angle $\theta$ of an object in flight, such as a golf ball 12, that has been launched from an initial position 14, for example by striking it with a golf club, may be determined. Determination of the launch angle $\theta$ is based upon a mathematical model. The mathematical model describes the relationship between the asymptotic or actual velocity of the ball 12, the measured velocity $V_m(t)$ of the ball 12 as a function of elapsed time t since the ball 12 was launched and a known geometrical relation between means for measuring the velocity of the ball 12, such as a Doppler Radar transceiver 16, and the initial position 14.

Figure 3:
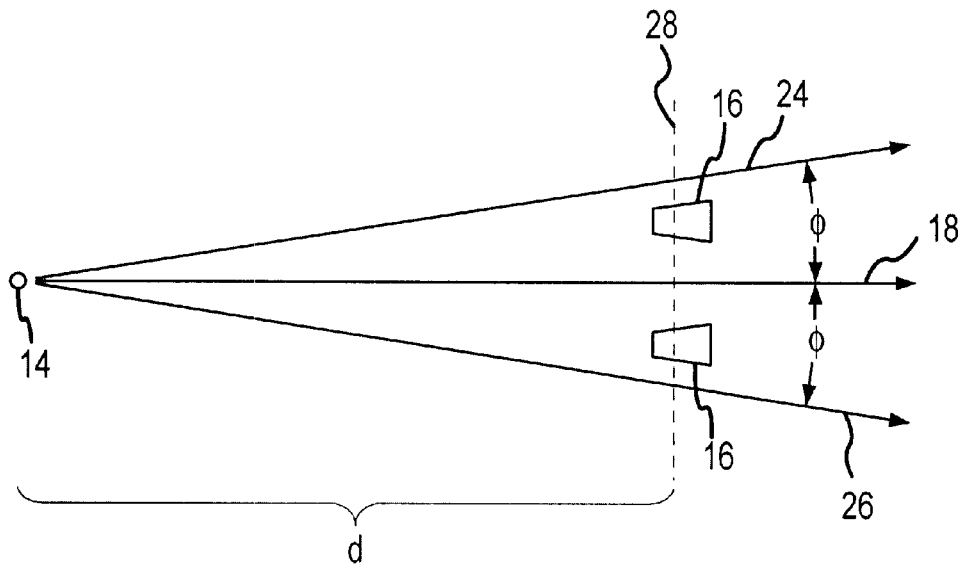
FIG. 3 illustrates a top view of another embodiment of the present invention wherein two transceivers are positioned for use in determining the launch angle and the aim angle of an object in flight after being launched from an initial position.
Figure 4:
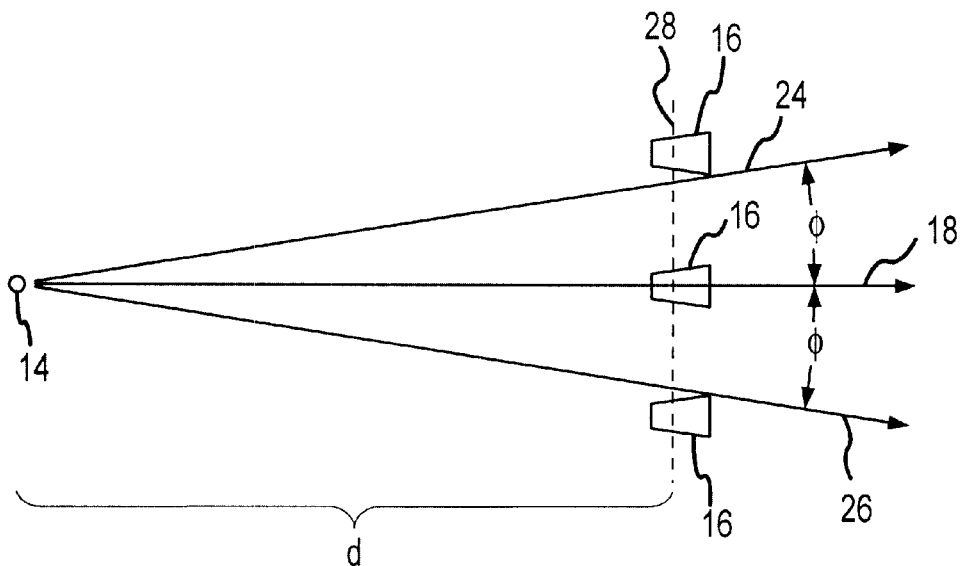
FIG. 4 illustrates a top view of a further embodiment of the present invention wherein three transceivers are positioned for use in determining the launch angle and the aim angle of an object in flight after being launched from an initial position.

Although other geometrical relationships are possible, in a first embodiment, the geometrical relationship between the transceiver 16 and the initial position 14 is as shown in FIGS. 1 and 2. The transceiver 16 is positioned forward of the initial position 14 along the projection 18 of the expected flight path onto the ground assuming the ball 12 is launched on a direct bearing towards a desired target location (i.e. assuming the aim angle, which may be determined as described below in reference to FIGS. 3 and 4, is zero). The transceiver 16 is positioned forward of the initial position 14 at a known distance d measured along the projection 18 of the expected straight flight path. Preferably, distance d is in the range of about two to six feet. In the mathematical model described below, the transceiver 16 is assumed to be at the same vertical level as the initial position 14 of the ball 12.

With the transceiver 16 thus positioned, the launch angle $\theta$ may be determined from a mathematical model comprised of the following six equations:

$$a=d^2 \qquad (1)$$

$$b=-2dc[1-\{v_m(t)/v_o\}^2] \qquad (2)$$

$$e=[v_m(t)/v_o^2][-c^2-d^2]+c^2 \qquad (3)$$

$$\text{root}=[b^2-4ae]^{1/2} \qquad (4)$$

$$\text{core}=(-b+\text{root})/2a \qquad (5)$$

$$\theta=\arctan[(1-\text{core}^2)^{1/2}/\text{core}] \qquad (6)$$

In the above six equations, $v_o$ is the actual velocity of the ball 12, t is the time elapsed since the launch of the ball, $v_m(t)$ is the measured velocity of the ball 12 at time t, c represents the total distance traveled by the ball 12 along the line of sight 20 from its position at time t to the initial position 14, d is the distance between the initial position 14 and the transceiver 16, and $\theta$ is the launch angle of the ball 12. Distance c is computed as the product of $v_o$ and t.

The measured ball velocity $v_m(t)$ at a given time t is obtained using the forward-placed transceiver 16 from the well known Doppler-shift effect. An acoustic trigger may be used to detect the time at which the ball 12 is launched in order to establish a reference for the elapsed time t since launch. Preferably, as the ball 12 moves through the field of view of transceiver 16, each Doppler difference pulse obtained by the transceiver 16 is recorded along with time stamp data. The data may be stored in data arrays in a computer interfaceable with the transceiver 16.

Since the ball 12 is not moving directly away from the forward-placed transceiver 16, the measured velocity $v_m(t)$ is initially not substantially the same as the actual velocity $v_o$ of the ball 12. Rather, the measured velocity $v_m(t)$ and the actual velocity $v_o$ are related by the following equation:

$$v_m(t)=v_o\cos\beta \qquad (7)$$

In equation (7), $\beta$ is the angle between the line of sight 20 from the ball 12 to the initial position 14 and the line of sight 22 from the ball 12 to the forward-placed transceiver 16. As the ball 12 travels further along its flight trajectory, angle $\beta$ approaches zero and the measured velocity $v_m(t)$ of the ball 12 asymptotically approaches the actual velocity $v_o$ of the ball as the elapsed time t since launch increases.

The actual velocity $v_o$ of the ball 12 may be obtained in a number of manners. For example, the latest occurring asymptotic velocity data acquired by the forward-placed transceiver 16 may be used to approximate the actual ball velocity $v_o$. The actual ball velocity $v_o$ may also be obtained using a separate Doppler Radar transceiver located in closer proximity to the initial position 14 (e.g. behind or along-side the initial position 14) than the forward-placed transceiver 16. Also, measurement techniques that do not rely on the Doppler-shift effect, such as beam-breaking or image-based speed sensing systems, may be used to obtain the actual ball velocity $v_o$.

When the actual velocity $v_o$ is determined, the launch angle $\theta$ may be computed using equations (1) through (6) and any selected measured velocity $v_m(t)$ of the ball 12 at a known time t since impact. Errors are reduced and the reliability and accuracy of the launch angle determination is improved if the launch angle $\theta$ is computed for a plurality of selected measured velocity $v_m(t)$ data points. The computed launch angles $\theta$ for each measured velocity $v_m(t)$ data point are then averaged to arrive at a determination of the launch angle $\theta$ of the ball 12. Preferably, in computing the launch angle $\theta$, measured velocity $v_m(t)$ data points are selected such that the ratio of each selected measured velocity $v(t)$ data point to the actual velocity $v_o$ is between about 0.7 and 0.8 because it has been found that such data provides the most reliable results.

Referring now to FIGS. 3 and 4, it may be appreciated that the actual flight path of the ball 12 may not be directly over the forward-placed transceiver 12. For example, the ball 12 may be struck such that the projection 24 of its actual flight path onto the ground deviates to the left from the projection 18 of the expected straight flight path. Such a situation will be referred to as having an aim angle $\phi$ that is negative. Alternatively, the projection 26 of the actual flight path of the ball 12 may deviate to the right from the projection 18 of the expected straight flight path. Such a situation will be referred to as having an aim angle $\phi$ that is positive. Where the aim angle $\phi$ is non-zero, the computed launch angle $\theta$ will be somewhat greater than the actual launch angle $\theta$. The positive error that results in the computed launch angle $\theta$ is small and is acceptable in many applications for small to moderate aim angles $\phi$. By using a plurality of forward-placed transceivers 16, the effect of positive or negative aim angle $\phi$ on the computed launch angle $\theta$ may be reduced, and, further, aim angle $\phi$ may be also be determined.

In an embodiment as shown in FIG. 3, two transceivers 16 are positioned along a line 28 forward of the initial position 14. The line 28 along which the transceivers 16 are placed is preferably substantially perpendicular to the projection 18 of the expected straight flight path. Further line 28 is at a known distance d measured along the projection 18 of the expected straight flight path forward of the initial position 14. Preferably distance d is between about four to six feet. One of the transceivers 16 is displaced laterally to the left from the projection 18 of the expected straight flight path and the other is displaced laterally to the right from the projection 18 of the expected straight flight path. As is illustrated, the two transceivers 16 are laterally displaced from the projection 18 of the expected straight flight path at locations along the line 28 corresponding to negative and positive aim angles of substantially the same magnitude.

After the ball 12 is launched, a launch angle computation as described above is independently performed for each of the two transceivers 16. If the ball 12 is launched straight, it is expected that the launch angle $\theta$ calculated using each of the two transceivers 16 will be substantially the same since the transceivers 16 are preferably equidistant from the projection 18 of the expected straight flight path. For shots hit progressively further to the left (i.e. increasingly negative aim angle $\phi$), the launch angle $\theta$ computed using data from the right transceiver 16 will be progressively larger than that computed using data from the left transceiver 16. Likewise, for shots hit progressively further to the right (i.e. increasingly positive aim angle $\phi$), the launch angle $\theta$ computed using data from the left transceiver 16 will be progressively larger than that computed using data from the right transceiver 16. Since the effect of non-zero aim angle $\phi$ (whether positive or negative) is to cause the computed launch angle $\theta$ to be larger than the actual launch angle $\theta$, the results of the two calculations are compared and the smaller result is reported as the actual launch angle $\theta$.

Whether the shot is to the left or right may also be ascertained based upon which of the two transceivers 16 provided data generating the smaller calculated launch angle $\theta$. Using the ratio of the two computed launch angle $\theta$ values, information about the aim angle $\phi$ may be obtained. For a given geometry of transceiver 16 positions, the relationship between the ratio of computed launch angle $\theta$ values and different aim angles $\phi$ may be calculated geometrically or determined empirically. Data describing this relationship may be stored in a look-up table for later use in determining the aim angle $\phi$ corresponding with the ratio of the two computed launch angles $\theta$.

In an embodiment as shown in FIG. 4, three transceivers 16 are positioned along a line 28 forward of the initial position 14. As with the embodiment of FIG. 3, the line 28 along which the transceivers 16 are placed is a known distance d, preferably between about four to six feet, measured along the projection 18 of the expected straight flight path forward of the initial position 14. One of the transceivers 16 is positioned in the center on the projection 18 of the expected straight flight path (i.e. at an aim angle of zero degrees). The other two transceivers 16 are laterally displaced to the left and right, respectively, from the projection 18 of the expected straight flight path at locations along the line 28 corresponding with negative and positive aim angles of substantially equal magnitude. For a given shot, three independent launch angle computations are made as described above. A straight shot will result in the computed launch angle $\theta$ from the center transceiver 16 being the smallest. Shots to the left and right, respectively, will result in the computed launch angle $\theta$ from the left and right transceivers 16, respectively, being the smallest. As before, the smallest of the three computed launch angles $\theta$ is reported as the actual launch angle $\theta$. Also, as with the implementation shown in FIG. 3, the aim angle $\phi$ can be correlated with the relative ratios of the computed launch angles $\theta$ from each of the three transceivers 16.

It should be appreciated that more than three transceivers 16 may be utilized to increase the range of shots of differing aim angles $\phi$ that may be accurately measured. Transceivers may be located along line 28 at substantially equally spaced aim angles $\phi$. By way of further example, transceivers 16 may placed at aim angles $\phi$ of 0 and +/−5, 10, and 15 degrees in order to cover a wide range of shots while maintaining accuracy in the determination of the launch angle $\theta$.

While various embodiments of the present invention have been described in detail, it is apparent that further modifications and adaptations of the invention will occur to those skilled in the art. However, it is expressly understood that such modifications and adaptations are within the spirit and scope of the present invention.

What is claimed is:

1. A method for determining at least one approximate launch parameter of an object in flight after being launched from an initial position comprising the steps of:

positioning a plurality of sensors for measuring a velocity of the object while in flight, wherein each sensor is positioned along a line substantially perpendicular to a projection onto the ground of a straight flight path expected when the object is launched on a direct bearing towards a desired target location, wherein the line is at a known distance forward of the initial position measured along the projection of the expected straight flight path, and wherein the sensors are positioned along the line at locations corresponding to selected aim angles;

measuring the velocity of the object while in flight using each of the sensors;

performing independent launch angle calculations corresponding with each sensor using a mathematical model; and using the results of the independent launch angle calculations to obtain at least one approximate launch parameter of the object, wherein an approximate aim angle is obtainable by direct calculation from ratios of the results of the independent launch angle calculations.

2. A method for determining at least one approximate launch parameter of an object in flight after being launched from an initial position comprising the steps of:

positioning a plurality of sensors for measuring a velocity of the object while in flight, wherein each sensor is positioned along a line substantially perpendicular to a projection onto the ground of a straight flight path expected when the object is launched on a direct bearing towards a desired target location, wherein the line is at a known distance forward of the initial position measured along the projection of the expected straight flight path, and wherein the sensors are positioned along the line at locations corresponding to selected aim angles;

measuring the velocity of the object while in flight using each of the sensors;

performing independent launch angle calculations corresponding with each sensor using a mathematical model; and using the results of the independent launch angle calculations to obtain at least one approximate launch parameter of the object, wherein an approximate launch angle is obtainable by examining the results of the independent launch angle calculations to determine which of the launch angle calculations resulted in the smallest calculated launch angle and selecting the smallest calculated launch angle as the launch angle of the object.

3. A method for determining a launch angle of a golf ball in flight after being launched from an initial position by striking it with a golf club, said method comprising the steps of:

operating a sensor positioned in a known geometrical relation with the initial position to obtain a measured velocity of the ball while in flight at an elapsed time after the ball is launched;

obtaining an actual velocity of the ball after being launched from the initial position; and calculating the launch angle of the ball in accordance with a mathematical model comprised of the following equations:

$$a = d^2 \quad (1)$$

$$b = -2dc[1 - \{v_m(t)/v_o\}^2] \quad (2)$$

$$e = [v_m(t)/v_o^2][-c^2 - d^2] + c^2 \quad (3)$$

$$\text{root} = [b^2 - 4ae]^{1/2} \quad (4)$$

$$\text{core} = (-b + \text{root})/2a \quad (5)$$

$$\theta = \arctan[(1 - \text{core}^2)^{1/2}/\text{core}] \quad (6)$$

wherein:

t is the time elapsed since launch of the ball;

$v_m(t)$ is the measured velocity of the ball at a selected time t;

$v_o$ is the actual velocity of the ball;

c represents the total distance traveled by the ball along a line of sight from its position at time t to the initial position and is computed as the product of $v_o$ and t;

d is the distance between the initial position and the position of the sensor measured along a projection of an expected straight flight path; and θ is the launch angle of the ball.

4. The method of claim 3 wherein in said step of operating, a plurality of measured velocities corresponding with different elapsed times after the ball is launched are obtained, and wherein in said step of obtaining, the measured velocity corresponding with the latest elapsed time is used to approximate the actual velocity of the ball.

5. The method of claim 3 wherein in said step of obtaining, the actual velocity of the ball is obtained using a Doppler radar transceiver positioned in close proximity to the initial position.

6. The method of claim 3 wherein in said step of obtaining, the actual velocity of the ball is obtained using a beam-breaking speed sensing system.

7. The method of claim 3 wherein in said step of obtaining, the actual velocity of the ball is obtained using an image-based speed sensing system.

8. The method of claim 3 wherein in said step of operating, the sensor is positioned forward of the initial position at a known distance measured along the projection of the expected straight flight path.

9. The method of claim 8 wherein the known distance is between about two and six feet.

10. The method of claim 3 wherein in said step of calculating, a plurality of measured velocities of the ball at different elapsed times after the ball is launched are used to calculate a plurality of launch angles in accordance with the mathematical model and the plurality of launch angles are averaged to determine the launch angle of the ball.

11. The method of claim 3 wherein in said step of operating, the sensor comprises a Doppler radar transceiver.

12. The method of claim 3 wherein the mathematical model is equivalently expressed as at least one equation using appropriate variable substitution.

13. An apparatus for use in determining a launch angle of a golf ball in flight after being launched from an initial position by striking it with a golf club, said apparatus comprising:

a sensor positionable in a known geometrical relation with the initial position and operable to obtain a measured velocity of the ball while in flight at an elapsed time after the ball is launched;

a mathematical model comprised of the following equations:

$$a = d^2 \quad (1)$$

$$b = -2dc[1 - \{v_m(t)/v_o\}^2] \quad (2)$$

$$e = [v_m(t)/v_o^2][-c^2 - d^2] + c^2 \quad (3)$$

$$\text{root} = [b^2 - 4ae]^{1/2} \quad (4)$$

$$\text{core} = (-b + \text{root})/2a \quad (5)$$

$$\theta = \arctan[(1-\text{core}^2)^{1/2}/\text{core}] \quad (6)$$

wherein:

t is the time elapsed since launch of the ball;

$v_m(t)$ is the measured velocity of the ball at a selected time t;

$v_o$ is an the actual velocity of the ball;

c represents the total distance traveled by the ball along a line of sight from its position at time t to the initial position and is computed as the product of $v_o$ and t;

d is the distance between the initial position and the position of the sensor measured along a projection of an expected straight flight path; and θ is the launch angle of the ball; and a computing device operable to calculate the launch angle of the ball in accordance with the mathematical model.

14. The apparatus of claim 13 wherein said sensor is operable to obtain a plurality of measured velocities corresponding with different elapsed times after the ball is launched, and wherein the actual velocity is approximated by the measured velocity corresponding with the latest elapsed time.

15. The apparatus of claim 13 wherein the actual velocity of the ball is obtainable using a Doppler radar transceiver positioned in close proximity to the initial position.

16. The apparatus of claim 13 wherein the actual velocity of the ball is obtainable using a beam-breaking speed sensing system.

17. The apparatus of claim 13 wherein the actual velocity of the ball is obtainable using an image-based speed sensing system.

18. The apparatus of claim 13 wherein said sensor is positionable forward of the initial position at a known distance measured along the projection of the expected straight flight path.

19. The apparatus of claim 18 wherein the known distance is between about two and six feet.

20. The apparatus of claim 13 wherein said sensor is operable to obtain a plurality of measured velocities of the ball at different elapsed times after the ball is launched, and wherein said computing device is operable to calculate a plurality of launch angles in accordance with the mathematical model and average the plurality of launch angles to determine the launch angle of the ball.

21. The apparatus of claim 13 wherein said sensor comprises a Doppler radar transceiver.

22. The apparatus of claim 13 wherein the mathematical model is equivalently expressed as at least one equation using appropriate variable substitution.

23. A method for determining at least one launch parameter of a golf ball in flight after being launched from an initial position by striking it with a golf club, said method comprising the steps of:

operating a plurality of sensors positioned in known geometrical relations with the initial position to obtain a measured velocity of the ball while in flight corresponding with each sensor at an elapsed time after the ball is launched;

obtaining an actual velocity of the ball after being launched from the initial position;

performing independent launch angle calculations corresponding with each sensor in accordance with a mathematical model comprising the following equations:

$$a = d^2 \quad (1)$$

$$b = -2dc[1 - \{v_m(t)/v_o\}^2] \quad (2)$$

$$e = [v_m(t)/v_o][-c^2-d^2]+c^2 \quad (3)$$

$$\text{root} = [b^2 - 4ae]^{1/2} \quad (4)$$

$$\text{core} = (-b + \text{root})/2a \quad (5)$$

$$\theta = \arctan[(1-\text{core}^2)^{1/2}/\text{core}] \quad (6)$$

wherein:

t is the time elapsed since launch of the ball;

$v_m(t)$ is the measured velocity of the ball at a selected time t;

$v_o$ is the actual velocity of the ball;

c represents the total distance traveled by the ball along a line of sight from its position at time t to the initial position and is computed as the product of $v_o$ and t;

d is the distance between the initial position and the position of the sensor measured along a projection of an expected straight flight path; and θ is a launch angle of the ball; and using the results of the independent launch angle calculations to obtain at least one approximate launch parameter of the ball.

24. The method of claim 23 wherein in said step of operating, a plurality of measured velocities corresponding with different elapsed times after the ball is launched are obtained for each sensor, and wherein in said step of obtaining, the measured velocity corresponding with the latest elapsed time is used to approximate the actual velocity of the ball.

25. The method of claim 23 wherein in said step of obtaining, the actual velocity of the ball is obtained using a Doppler radar transceiver positioned in close proximity to the initial position.

26. The method of claim 23 wherein in said step of obtaining, the actual velocity of the ball is obtained using a beam-breaking speed sensing system.

27. The method of claim 23 wherein in said step of obtaining, the actual velocity of the ball is obtained using an image-based speed sensing system.

28. The method of claim 23 wherein, in said step of operating, the sensors are positioned in known geometric relations with the initial position such that, in said step of using, at least one of a launch angle and an aim angle of the ball are obtainable by at least one of direct calculation using the results of the independent launch angle calculations, interpolation of the results of the independent launch angle calculations, and examination of the results of the independent launch angle calculations.

29. The method of claim 23 wherein in said step of operating, the sensors are positioned at locations corresponding to selected aim angles along a line substantially perpendicular to the projection of the expected straight flight path, the line being at a known distance forward of the initial position measured along the projection of the expected straight flight path.

30. The method of claim 29 wherein the known distance is between about four and six feet.

31. The method of claim 23 wherein in said step of performing independent launch angle calculations, a plurality of measured velocities of the ball at different elapsed times after the ball is launched corresponding with each sensor are used to calculate a plurality of launch angles corresponding with each sensor in accordance with the mathematical model and the plurality of launch angles are averaged to determine the launch angle corresponding with each sensor.

32. The method of claim 23 wherein in said step of operating, the sensors comprise Doppler radar transceivers.

33. The method of claim 23 wherein the mathematical model is equivalently expressed as at least one equation using appropriate variable substitution.

34. An apparatus for use in determining at least one launch parameter of a golf ball in flight after being launched from an initial position by striking it with a golf club, said apparatus comprising:

a plurality of sensors, each said sensor being positionable in a known geometrical relation with the initial position and operable to obtain a measured velocity of the ball while in flight corresponding with such sensor at an elapsed time after the ball is launched;

a mathematical model comprising the following equations:

$$a = d^2 \quad (1)$$

$$b = -2dc[1 - \{v_m(t)/v_o\}^2] \quad (2)$$

$$e = [v_m(t)/v_o^2][-c^2 - d^2] + c^2 \quad (3)$$

$$\text{root} = [b^2 - 4ae]^{1/2} \quad (4)$$

$$\text{core} = (-b + \text{root})/2a \quad (5)$$

$$\theta = \arctan[(1 - \text{core}^2)^{1/2}/\text{core}] \quad (6)$$

wherein:

t is the time elapsed since launch of the ball;

$v_m(t)$ is the measured velocity of the ball at a selected time t;

$v_o$ is an actual velocity of the ball;

c represents the total distance traveled by the ball along a line of sight from its position at time t to the initial position and is computed as the product of $v_o$ and t;

d is the distance between the initial position and the position of the sensor measured along a projection of an expected straight flight path; and θ is a launch angle of the ball; and a computing device operable to perform independent launch angle calculations corresponding with each sensor in accordance with the mathematical model, wherein at least one launch parameter is obtainable from the results of the independent launch angle calculations.

35. The apparatus of claim 34 wherein each said sensor is operable to obtain a plurality of measured velocities corresponding with different elapsed times after the ball is launched, and wherein the actual velocity is approximated by the measured velocity corresponding with the latest elapsed time.

36. The apparatus of claim 34 wherein the actual velocity of the ball is obtainable using a Doppler radar transceiver positioned in close proximity to the initial position.

37. The apparatus of claim 34 wherein the actual velocity of the ball is obtainable using a beam-breaking speed sensing system.

38. The apparatus of claim 34 wherein the actual velocity of the ball is obtainable using an image-based speed sensing system.

39. The apparatus of claim 34 wherein said sensors are positionable in known geometric relations with the initial position such that a launch angle and an aim angle of the ball are obtainable by at least one of direct calculation using the results of the independent launch angle calculations, interpolation of the results of the independent launch angle calculations, and examination of the results of the independent launch angle calculations.

40. The apparatus of claim 34 wherein said sensors are positionable at locations corresponding to selected aim angles along a line substantially perpendicular to the projection of the expected straight flight path, the line being at a known distance forward of the initial position measured along the projection of the expected straight flight path.

41. The apparatus of claim 40 wherein the known distance is between about four and six feet.

42. The apparatus of claim 34 wherein each said sensor is operable to obtain a plurality of measured velocities of the ball corresponding with such sensor at different elapsed times after the ball is launched, and wherein said computing device is operable to perform multiple independent launch angle calculations for each sensor in accordance with the mathematical model and to average the calculated launch angles to determine the launch angle of the ball corresponding with such sensor.

43. The apparatus of claim 34 wherein each said sensor comprises a Doppler radar transceiver.

44. The apparatus of claim 34 wherein the mathematical model is equivalently expressed as at least one equation using appropriate variable substitution.

* * * * *

UNITED STATES PATENT AND TRADEMARK OFFICE
CERTIFICATE OF CORRECTION

PATENT NO. : 6,547,671 B1
DATED : April 15, 2003
INVENTOR(S) : Mihran

It is certified that error appears in the above-identified patent and that said Letters Patent is hereby corrected as shown below:

Column 9,
Line 8, delete the first occurrence of "the";

Column 10,
Line 1, after $v_o$, insert -- $^2$ --.

Signed and Sealed this

First Day of July, 2003

JAMES E. ROGAN
*Director of the United States Patent and Trademark Office*